(No Model.) 2 Sheets—Sheet 1.

I. N. LEWIS.
RANGE AND POSITION FINDER.

No. 600,083. Patented Mar. 1, 1898.

WITNESSES:
C. L. Belcher
H. H. Capel.

INVENTOR
Isaac N. Lewis.
BY
H. C. Townsend
ATTORNEY (No Model.) 2 Sheets—Sheet 2.

I. N. LEWIS.
RANGE AND POSITION FINDER.

No. 600,083. Patented Mar. 1, 1898.

WITNESSES:
C. L. Belcher
H. H. Capel.

INVENTOR
Isaac N. Lewis.
BY
J. C. Townsend
ATTORNEY

UNITED STATES PATENT OFFICE.

ISAAC N. LEWIS, OF FORT WADSWORTH, NEW YORK, ASSIGNOR TO THE DRIGGS-SEABURY GUN AND AMMUNITION COMPANY, OF NEW JERSEY.

RANGE AND POSITION FINDER.

SPECIFICATION forming part of Letters Patent No. 600,083, dated March 1, 1898.

Application filed January 26, 1897. Serial No. 620,825. (No model.)

*To all whom it may concern:*

Be it known that I, ISAAC N. LEWIS, a citizen of the United States, and a resident of Fort Wadsworth, in the county of Richmond and State of New York, have invented a certain new and useful Range and Position Finder, of which the following is a specification.

This invention relates to range and position finders intended for use in coast defense. It particularly relates to that class of these instruments which operate upon a vertical base and to certain essential improvements upon the instrument which forms the subject of United States Letters Patent No. 447,335, granted March 3, 1891. Range and position finders of this class are particularly well adapted for coast defense, since by one of these instruments a single operator can accurately and immediately locate an object at sea and readily follow its course, the instrument being so constructed and provided with quick-reading devices that the successive positions of such object may be read at a glance.

One object of this invention is to construct quick-reading devices for this class of instruments which will dispense with verniers, give more accurate readings, and which may be read in much less time.

Another object of the invention is to so construct said quick-reading devices and so associate them with the other parts of the range and position finder that they will be actuated in the routine operation of the instrument and show the absolute position of the object the instant the instrument is brought to rest.

Another object of the invention is to simplify in every detail the parts of the instrument shown in the aforesaid patent.

With these objects in view the invention consists in the construction, combination, and arrangement of parts hereinafter fully described, and set forth in the claims.

Figure 1:
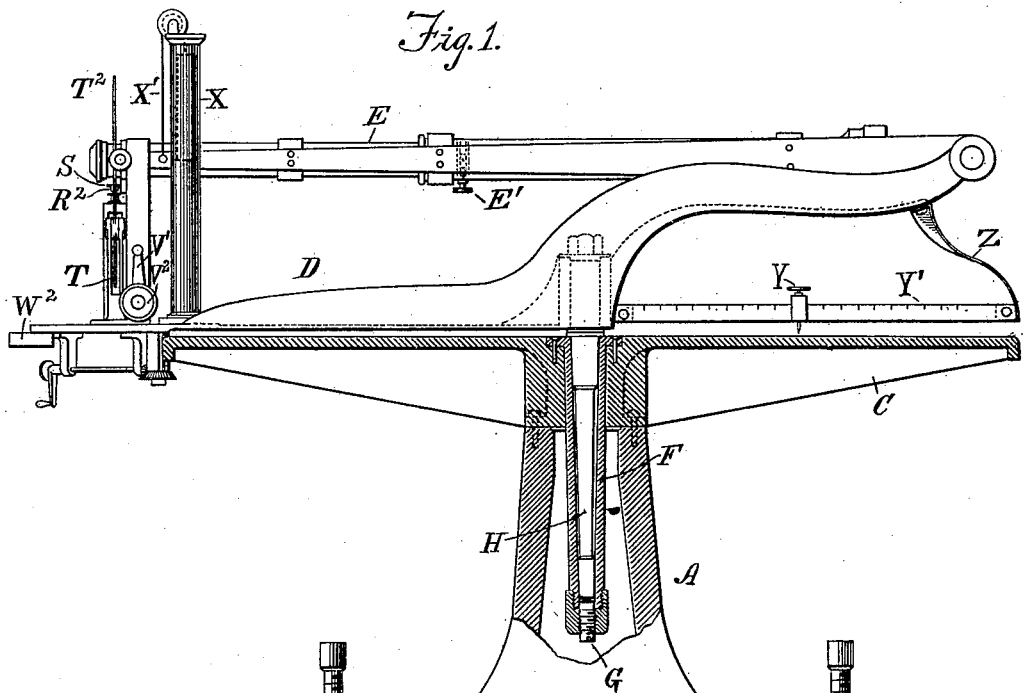
Figure 2:
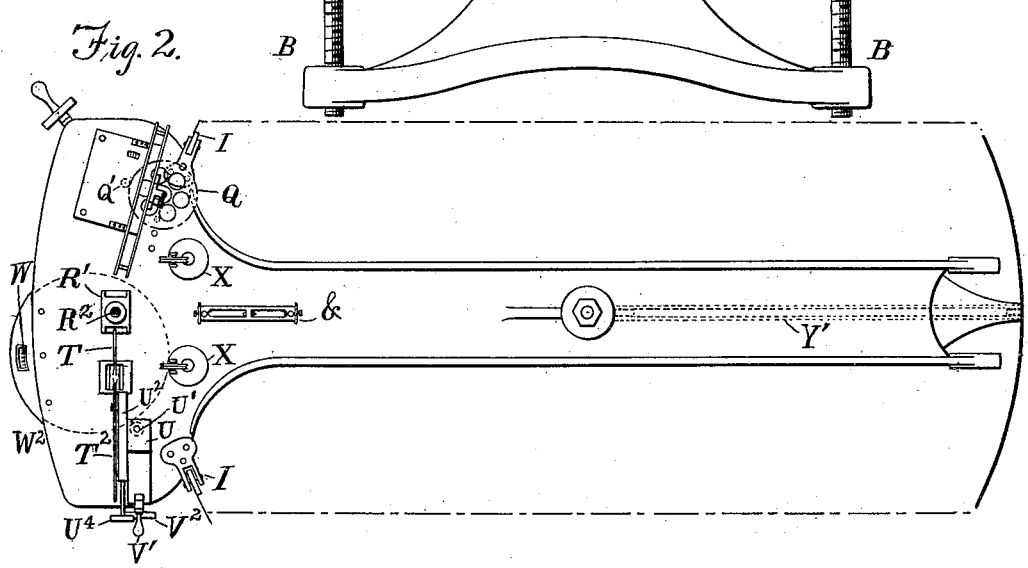
Figure 5:
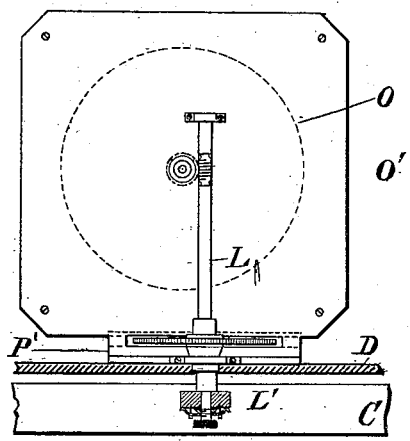
Figure 3:
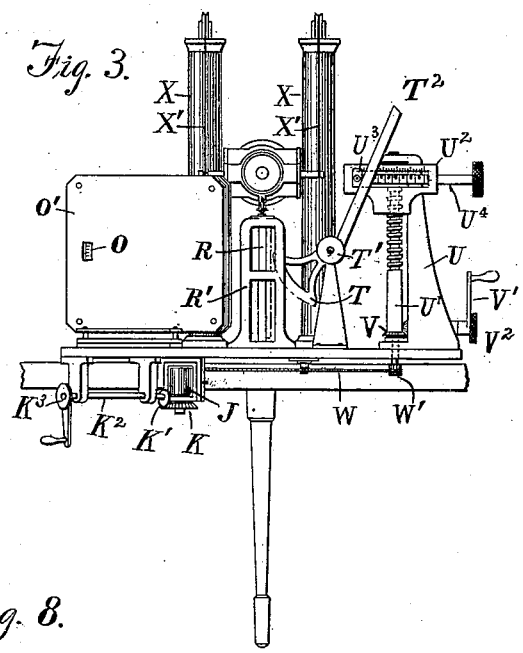
Figure 8:
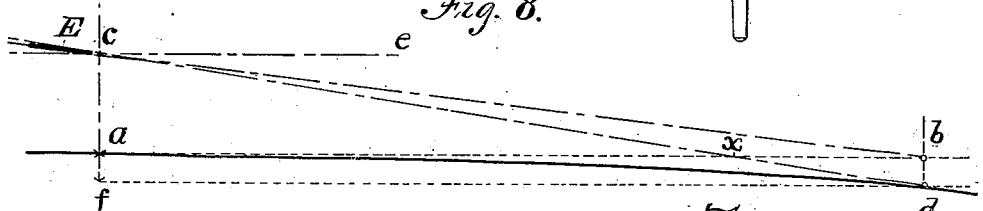
Figure 6:
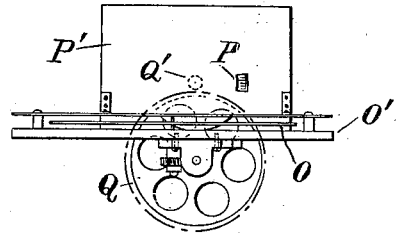
Figure 4:
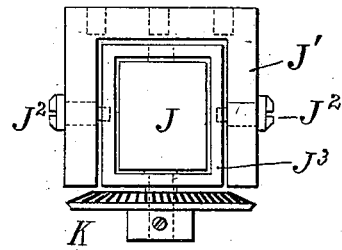
Figure 7:
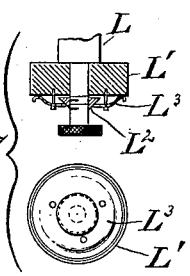

In the accompanying drawings, which form a part of this specification, Figure 1 represents, in partially-sectionized side elevation, a range and position finder embodying this invention. Fig. 2 represents in plan the traversing arm of this instrument, the telescope being removed. Fig. 3 is an elevation of the rear end of the instrument, the pedestal being omitted. Fig. 4 is a detail of one of the parts of said instrument. Fig. 5 is a rear view of the quick-reading device for giving the azimuth of an object. Fig. 6 is a plan of said device. Fig. 7 represents, in vertical section and under-side plan, an adjusting attachment for the azimuth-indicator. Fig. 8 is a diagram explaining the problem of obtaining the range of an object by a range-finder operating on a vertical base.

Before proceeding to a detail description of this instrument and its operation it is deemed best to call attention to the fact that in range-finders having a vertical base the location of an object is always a problem in right-angle triangulation. The height of the pivotal point of the instrument's telescope above sea-level is the base of triangulation for all azimuths taken from that position of the instrument and it is the vertical of the right-angle triangle of every range observation. The range of the object observed is the horizontal of said triangle. The line of collimation of the instrument when establishing the range of an object is the hypotenuse of the triangle, and the angle between this and the horizontal is the angle of depression through which the telescope of the instrument is moved in directing it upon the object.

The instrument illustrated for carrying out the objects of this invention has a pedestal A, provided with suitable leveling-screws B, a circular table C, planed perfectly smooth on top and edge and mounted upon the pedestal, and a traversing arm D, which carries the telescope E, and the mechanism for manipulating it and for indicating the various positions in which it may be moved.

The traversing arm may be of any desired form; but by preference it has its forward end elevated in a manner to leave a clear space between it and the table, substantially as shown. In the forward end of this arm on suitable trunnions is mounted the frame which carries the telescope, and the rear end of the arm is flattened horizontally to furnish a platform for the support of the manipulating devices of the instrument and the quick-reading devices or indicators.

To provide for a free movement of the traversing arm, a female center F is mounted in the table and depends into the pedestal. This center, as shown, is contracted downwardly and at its lower end provided with an adjusting-screw G, upon which rests the male center H, which is rigidly secured to the traversing arm and tapered to correspond with the female center. By the movement of screw G the friction between the parts F and H may be varied and the free movement of the traversing arm regulated. Two other points of support for the arm D are furnished by means of the rollers I, which are mounted on the platform of said arm and roll upon the table C.

The traversing arm may be rotated about its center by any suitable means. The means illustrated consists of a friction-roller J, mounted on the arm D and bearing upon the edge of the table C. This roller is by preference mounted as shown in detail in Fig. 4, wherein a bracket J' is constructed for attachment to the under side of the said arm, Figs. 1 and 3. In this bracket, by means of lateral trunnions $J^2$, is pivoted a frame $J^3$, and in this the roller J is journaled. This manner of mounting the roller insures an even bearing thereof for its entire length upon the edge of the table. The lower journal of the roller is extended through the frame, and upon it is fixed the bevel-gear K. Meshing with this gear is the bevel-pinion K', and this is carried on the shaft $K^2$, which is journaled in brackets depending from the arm D. The outer end of the shaft $K^2$ is provided with a crank for rapid movement and with a milled head $K^3$ for slight rotation of the shaft in obtaining fine adjustment. It will be seen that by the rotation of shaft $K^2$ the traversing arm may be rotated upon its center H. Obviously instead of the friction-roller and bevel-gear a spur-gear might be cut on the edge of the table and a pinion to mesh therewith substituted for the bevel-pinion K'.

The rotation of the traversing arm is for the purpose of obtaining the azimuth of an object.

Various means may be adopted for indicating the azimuth. The one here shown is of the quick-reading sort and is operated as the arm is rotated. This device has a vertical shaft L, mounted in the platform of arm D and provided with a friction-roller L', which engages with the edge of the table C. By this means rotation is imparted to the shaft L. This shaft transmits motion to the scales or indicators of the quick-reading azimuth device. For this purpose the shaft L has a worm M cut thereon, with which meshes a worm-wheel N for the rotation of the degree-scale O, which is located in the casing O' and which displays its graduations through an opening in the face of the casing, as seen in Fig. 3. Minutes of arc are indicated by a disk P, located in the casing P' and rotated through a train of multiplying-gearing consisting of the gear Q on shaft L and the pinion Q' in mesh therewith and mounted on the same shaft as the scale P. The graduations of the scale P are displayed through an opening in the face of casing P', as seen in Figs. 2 and 6, and having the usual pointer or index. The pitch-lines of the aforesaid gears, where seen in plan, are represented by broken lines. In order to place the traversing arm and these scales at an initial or zero position, the friction-wheel L' is adjustably mounted upon the shaft L. This adjustment may be made in any suitable manner. One way of accomplishing it (illustrated in Fig. 7) consists in making wheel L' movable about shaft L, providing said shaft with a conical nut $L^2$ and a milled head, and in attaching a flexible disk $L^3$ to the face of wheel L' by screws, which may clamp the conical nut between the wheel and disk, thereby fixing the wheel against rotation upon the shaft. To adjust the azimuth-scale to correspond with the zero position of the traversing arm, it is then only necessary to loosen the screws in disk $L^3$, give shaft L the necessary rotation by means of the milled head, and then tighten said screws.

The rear end of the telescope is supported upon a vertically-movable column R, guided in the bracket R', which is mounted upon the traversing arm. On the upper end of this column is preferably mounted a grooved roller $R^2$, upon which rests a pin S, projecting from one of the cross-pieces of the telescope frame or support. For raising the column a rack is formed upon it, with which meshes a sector-gear T. This sector is journaled in a stand T' and is provided with an arm or lever $T^2$, by which its movement is controlled. Upon this platform of the traversing arm at the side of this stand is erected a support U, in which is journaled a vertical screw U'. Upon this screw is a nut, which carries a transverse slotted plate $U^2$. Along the upper edge of this slot is located a scale, and in the slot is a nut $U^3$, threaded upon a screw $U^4$, which in any suitable manner is fixed against endwise movement in said plate. This screw is provided with a milled head, and as it is turned the nut $U^3$ moves through the slot to any desired position on the scale. Upon the face of the nut $U^3$ is mounted a small roller, against which the arm $T^2$ bears.

To rotate the screw U', and so raise or lower the plate $U^2$, a bevel-gear, as at V, may be employed, one pinion of which is upon the screw U', while the other is upon a horizontal shaft carrying the crank V'. For fine adjustments may be used the milled head $V^2$, mounted with the crank upon this shaft.

The effect of the rotation of the screw U', and therefore the change in the elevation of the eyepiece of the telescope, may be indicated by means of a disk, as W, which is journaled on a stud depending from the platform of the arm D and is provided with a toothed edge, with which meshes the pinion W', mounted on the lower end of the screw-shaft U'. The edge of this disk projects beyond the platform of arm D and is housed by casing W², through an opening in which its graduation may be read. This casing W² is omitted in Fig. 3.

It is only necessary that such a portion of the weight of the telescope shall be borne by the column R and therefore by the arm T² as will keep said arm in intimate contact with the roller carried by nut U³. Therefore the telescope is suitably counterweighted, as by weights located in the columns X, and joined to the telescope-supporting frame, as by flexible connections X', which pass over suitable pulleys on the top of said columns.

It will be seen then by referring particularly to Fig. 3 that any rotation of the screw U⁴ will affect the elevation of the eyepiece of the telescope, and the rotation of the screw U' will also affect the elevation of the eyepiece of the telescope and at the same time rotate the indicator-disk W, from which may be read the range of the object sighted, the ranges within the capacity of the instrument having been computed for the various angles of depression to which the telescope is adapted and marked upon the disk W. As the ranges vary unequally for successive equal angles of depression, the scale is one of unequal graduations.

Each instrument is constructed to operate accurately at elevations between certain limits and for certain ranges. The adjustment of an instrument to a certain altitude, or, in other words, to a certain vertical base, is effected by moving nut U² to the graduations upon its scale which correspond to that particular base, said scale having been plotted to correspond to the possible changes of base within the capacity of the instrument. This scale on the slotted plate may therefore be termed the "altitude" scale.

Any movement of the nut U² produces through the parts T², T, and R a movement in the telescope corresponding to the change of base indicated upon said scale. A change of base through a change in location of the instrument must be corrected by moving this nut. Mean low tide is taken as the initial point in reckoning the working base, and any change in tide must be corrected by moving this nut the predetermined amount corresponding thereto.

In making observations the various ranges may, if desired, be plotted by means of a suitable marker Y, movably mounted upon scales, as Y', attached at one end to the hub of arm D and at the other to a bracket, as Z, depending from said arm. Paper being spread upon the table C, it only remains, when the range of an object is determined, to move the marker to the point on the scale corresponding to the range found and press it down onto the paper. Radial lines drawn from the center of table C will show the azimuths of the objects whose ranges are plotted.

For leveling the instrument a suitable spirit-level may be mounted, as at &, upon the arm D. Then by moving the arm first into the plane of one and then of another leg of the pedestal A and working the screws B the instrument is speedily brought to the proper position.

Before detailing the operation of the instrument it may be well to refer to the diagram Fig. 8 and point out the difficulties in the way of a vertical-base range-finder and how this invention overcomes such difficulties.

Let the heavy short line E represent the telescope; $c$, its pivotal point; $a\,c$, the elevation of said point above mean low tide; $a\,b$, the apparent level of the water; $a\,d$, the true surface of the water, and $c\,e$ a horizontal line through the pivotal point of the telescope. Then were the telescope turned on an object at $b$ the line of collimation would be $c\,b$ and the right-angle triangle $c\,a\,b$. The angle of depression of the telescope would then be $e\,c\,b$, to which the angle $c\,b\,a$ is equal. Then knowing the latter angle the horizontal distance or range of the object at $b$ can be readily computed; but an object in the water at the distance $a\,b$ would on account of the curvature of the earth be at a point below $b$, as at $d$. To reach this object, a greater depression of the telescope is necessary; but in effecting this depression the line of collimation cuts the line $a\,b$, as at $x$, and in computing the range of the object from the new angle of depression $e\,c\,d$ and the base $a\,c$ an erroneous range $a\,x$ would be obtained. The distance of any point on the curve $a\,d$ below the tangent $a\,b$ is known and an allowance on account thereof for each unit of range may be made on the range-scale W in the construction of the machine, so that when an object is sighted, as at $d$, the true base for that range is the sum of the base $a\,c$ and the distance ($b\,d$) which that object is below the tangent $a\,b$ (or $c\,f$.) The true range $f\,d$ is then readily obtainable. In making this correction for curvature of the earth account must be taken of refraction of the atmosphere, which has the effect of elevating the object above its true position. This effect under normal atmospheric conditions is found to be about one-seventh the effect of curvature. This correction for mean refraction being, on account of a permanent condition, for all ranges within the capacity of a certain instrument is in the construction of the instrument computed for each unit of range indicated upon the scale W. There are still two corrections which must be made for variable conditions, such as the rise and fall of tides and abnormal refraction. These corrections must be made by adjustments in the instrument and will be brought out in describing the operation of the instrument.

The instrument is set up and adjusted by means of screw U⁴, so that its working base equals its altitude above mean low tide. Then when an observation is to be taken the reading from a tide-gage is obtained and the nut U³ moved along to a point on the scale of plate U² corresponding to the working base for that particular height of tide. This movement shifts the telescope into position for all ranges within the scope of the instrument at that height of tide. Then to correct for abnormal refraction the instrument may be set for the range of some known object, and if by turning it upon that object the horizontal cross-hair of the telescope does not coincide with the water-line thereof the cross-hair must be adjusted until such coincidence is effected. This is done by turning a screw, as E', which controls the position of said cross-hair, the cross-hair being mounted in a vertically-adjustable frame in the well-known manner. The instrument having been brought into consonance with the prevailing conditions, the traversing arm is then moved in azimuth by the rotation of shaft K² until the telescope points in the direction of the object whose range is to be determined. Then by turning the crank V or head V² the telescope will be tilted until the horizontal cross-hair coincides with the water-line of the object. The range may then be immediately read directly from the scale W in yards and the azimuth read directly from the scales O and P in degrees and minutes, respectively.

So rapidly can the parts of the instrument be manipulated that an object within the field of the instrument may be accurately located in less than ten seconds, and, if desired, the course of a moving object may be plotted by points at intervals of ten seconds.

It will be observed that the parts of the instrument are few and simple and may be made very strong, so that the instrument while adapted to do fine work will yet be strong enough to withstand very rough usage.

It will be noted that the range and direction scales are operated by those movements of the instrument by which an object is located, and that as soon as the object is located the readings may be directly taken from the scales without calculation or computation of any sort. This is important, as it enables any man of ordinary intelligence to operate the instrument. It is also to be noted that the scales are operated through trains of multiplying-gearing from parts of the instrument necessarily moved in locating an object, and that in the azimuth-indicating device the table of the instrument is in reality the motor-gear of the train operating the degree and minute scales. These constructions give instantaneous and accurate indications and dispense with all forms of verniers.

The instrument as above described is adapted to be moved from one location to another, but is intended more especially for use at some fixed place, while another instrument of this same class, which forms the subject-matter of another application filed by me of even date herewith, is of lighter construction and especially designed for shifting from one location to another.

Many changes in the construction and combination of parts aside from those above suggested may be made without departing from the spirit of my invention.

What I claim as my invention is—

1. The combination with a telescope mounted to move horizontally about a center, of a quick-reading azimuth device having two sets of pointers and scales graduated to degrees and minutes respectively and all mounted to move with the telescope, and means whereby the horizontal movement of the telescope communicates motion to the movable parts of the azimuth device.

2. In a position-finder, a telescope movable horizontally about a fixed point, two indices showing the angular movement of the telescope about said point in degrees and minutes respectively, a train of multiplying-gearing for operating the indices, and means for rotating the telescope and at the same time actuating the train of gearing so that upon fixing the telescope the correct azimuth thereof can be immediately read upon the indices.

3. The combination with a telescope mounted on a table to move horizontally about a center, of a quick-reading azimuth device mounted with the telescope and of which the indices are connected by a train of gearing to the table so that as the telescope is moved about said center the azimuth device will be actuated and will give in degrees and minutes an immediate indication of any position of the telescope.

4. The combination with the table, of the traversing arm pivotally mounted thereon, the telescope swung on said arm, gearing connecting the arm to the table, means for rotating the gearing, and an azimuth-reading device mounted on said arm and also having an operating connection with the table whereby as the arm is moved its every position will be indicated in degrees and minutes.

5. The combination with the table, of the traversing arm pivotally mounted thereon, gear mechanism for rotating it about said pivot, an azimuth-reading device operated by the arm and constructed to give in degrees and minutes immediate indications of the azimuths of said arm, a telescope pivotally mounted on said arm, means for tilting it to observe an object, and a quick-reading device carried by the arm and operated to give the range of the object by tilting the telescope to sight the object.

6. The combination with the table, of the transversing arm pivotally mounted at the center of the table, a bracket J' secured to the under side of said arm, a frame horizontally pivoted in said bracket, a friction-roller journaled vertically in said frame, and means for turning said roller to make said arm traverse the table.

7. The combination with the table and the traversing arm centrally pivoted upon the table, of means for moving said arm about its pivot, an azimuth-indicating device mounted upon said arm and having a vertical shaft for transmitting motion to the indices, a friction-wheel at the lower end thereof engaging with the edge of the table, and means for adjusting said shaft within said wheel.

8. The combination with the table and the vertical motor-shaft of the azimuth-indicator, of the friction-wheel upon the end of said shaft to engage with the edge of the table, the cone upon the shaft, the plate bearing upon the cone and the wheel, and means for clamping the cone between the wheel and plate to secure the former rigidly to the shaft.

9. The combination with the table and the traversing arm, of the shaft L, provided with means for taking motion from the table as said arm is rotated, a degree-scale operated from said shaft by a gear, and a minute-scale also operated from said shaft, substantially as set forth.

10. In a range-finder, the combination with the telescope, of mechanism for tilting it in a vertical plane, a device operating upon said mechanism for fixing and correcting the working base of the instrument, and an indicator operated by the tilting mechanism and graduated to show at a glance the exact range of any object observed.

11. The combination of the telescope pivoted to move in a vertical plane, a vertically-movable support for the eyepiece end thereof, a lever for moving said support, a range-scale as W, a vertical screw, a plate movable thereon and carrying a projection engaging one end of said lever, and a pinion carried by said screw for rotating said scale.

12. The combination of the traversing arm, the telescope-support pivoted thereon, the telescope, the vertically-movable column under the eyepiece end of the telescope, the counterweights, and means for gradually raising and lowering said column.

13. The combination with the tilting telescope, the column under the eyepiece end thereof, the lever for moving said column, the vertical rotary screw, the plate moved vertically thereby, a rotary screw horizontally mounted in said plate, a nut movable thereby and having a projection engaging with said lever, a scale on said plate by which to locate said nut, and an index operated by the vertical screw to give the range of an object observed.

14. In a range-finder, the combination with the telescope and a range-scale, of a horizontal cross-wire within the telescope adjustable above and below its mean position to correct for abnormal refraction and without affecting the readings from the range-scale.

15. The combination with a telescope mounted for depression, of a range-scale graduated in units of distance, an operating-shaft, gear mechanism between the same and the telescope, and gear mechanism between said shaft and the range-scale whereby through rotation of said shaft the telescope and the scale may be moved together, as and for the purpose set forth.

16. In a range-finder, the combination with a telescope pivoted for depression, of a range-scale having unequal graduations, a lever for moving the telescope about its pivot, and a device for imparting movement to the range-scale and having a projection movable in a right line and engaging with said lever for imparting movement to the telescope.

17. In a range-finder, the combination with a telescope mounted to tilt in a vertical plane, of a vertically-movable support for the eyepiece of the telescope, an indicator for indicating the range, a lever pivoted on a fixed support, and a stud or projection moving in a right line and engaging the lever, said lever and projection being interposed between the telescope and indicator, as and for the purpose described.

18. In a range-finder, the combination with a vertically-tilting telescope, a lever for moving said telescope to desired angles of depression, a projection engaging said lever and adjustable toward or from the fulcrum of the lever to correct for variations in the base of triangulation, and means for moving said projection vertically and thereby tilting the lever and the telescope.

19. The combination of the telescope pivoted to move in a vertical plane, a vertically-movable column as R, supporting the eyepiece end thereof and having a movable connection therewith, a rack upon one side of said column, a sector-lever engaging with said rack, a range-indicator, and means for actuating said lever and indicator simultaneously.

20. In a range and position finder, a range-scale the units of which are corrected for normal refraction, and adjustment means for making corrections for abnormal refraction.

21. The combination with the table and the traversing arm centrally pivoted upon the table, an azimuth-indicating device mounted upon said arm and having an operating-shaft carried by the arm for transmitting motion to the indices, a wheel on the shaft, and means for adjusting said shaft within said wheel.

22. The combination with the table and the motor-shaft of the azimuth-indicator, of the wheel upon said shaft, the cone upon the shaft, the plate bearing upon the cone and the wheel, and means for clamping the cone between the wheel and plate to secure the former rigidly to the shaft.

Signed at New York, in the county of New York and State of New York, this 25th day of January, A. D. 1897.

ISAAC N. LEWIS.

Witnesses:
WM. H. CAPEL,
C. L. BELCHER.